US008626826B2

(12) United States Patent
Fujii

(10) Patent No.: US 8,626,826 B2
(45) Date of Patent: Jan. 7, 2014

(54) TERMINAL APPARATUS, ELECTRONIC APPARATUS, AND ACCESS KEY ASSIGNMENT METHOD AND PROGRAM

(75) Inventor: Hironori Fujii, Tokyo (JP)

(73) Assignee: Sony Corporation, Tokyo (JP)

( * ) Notice: Subject to any disclaimer, the term of this patent is extended or adjusted under 35 U.S.C. 154(b) by 137 days.

(21) Appl. No.: 13/043,685

(22) Filed: Mar. 9, 2011

(65) Prior Publication Data

US 2011/0282935 A1 Nov. 17, 2011

(30) Foreign Application Priority Data

May 12, 2010 (JP) ................................ 2010-110461

(51) Int. Cl.
*G06F 15/16* (2006.01)
(52) U.S. Cl.
USPC .......................................................... 709/203
(58) Field of Classification Search
USPC .................. 715/513, 827, 835; 345/172, 173; 707/1, 513; 709/203
See application file for complete search history.

(56) References Cited

U.S. PATENT DOCUMENTS

| | | | | |
|---|---|---|---|---|
| 5,258,748 A * | 11/1993 | Jones | 345/172 |
| 6,993,721 B2 * | 1/2006 | Rosin et al. | 715/738 |
| 7,065,188 B1 * | 6/2006 | Mei et al. | 379/88.23 |
| 7,379,965 B2 * | 5/2008 | Sherwood et al. | 709/203 |
| 7,721,222 B1 * | 5/2010 | Shaik | 715/773 |
| 2002/0107888 A1 * | 8/2002 | Chiu et al. | 707/513 |
| 2003/0115167 A1 * | 6/2003 | Sharif et al. | 707/1 |
| 2004/0199871 A1 * | 10/2004 | Lee | 715/513 |
| 2005/0193328 A1 * | 9/2005 | Agrawala et al. | 715/513 |
| 2006/0209035 A1 * | 9/2006 | Jenkins et al. | 345/172 |
| 2007/0024589 A1 * | 2/2007 | Fux et al. | 345/171 |
| 2007/0080954 A1 * | 4/2007 | Griffin et al. | 345/173 |
| 2007/0168588 A1 * | 7/2007 | Elizarov et al. | 710/67 |
| 2007/0239425 A1 * | 10/2007 | Fux | 704/3 |
| 2009/0316202 A1 * | 12/2009 | Ueda | 358/1.15 |
| 2010/0005463 A1 * | 1/2010 | Chang et al. | 717/178 |
| 2010/0115159 A1 * | 5/2010 | Cookson | 710/67 |
| 2010/0122213 A1 * | 5/2010 | Chen | 715/827 |
| 2010/0149592 A1 * | 6/2010 | Yoshida | 358/1.15 |
| 2010/0251125 A1 * | 9/2010 | Kim et al. | 715/735 |
| 2010/0333034 A1 * | 12/2010 | Carlson et al. | 715/835 |

FOREIGN PATENT DOCUMENTS

JP 2007-280028 10/2007

* cited by examiner

*Primary Examiner* — Imad Hussain
(74) *Attorney, Agent, or Firm* — Oblon, Spivak, McClelland, Maier & Neustadt, L.L.P.

(57) ABSTRACT

A terminal apparatus includes a communication unit and a controller. The communication unit receives information of a web page from a web server. The controller extracts commands included in the information of the web page by analyzing the received information of the web page, and assigns access key functions to the extracted commands.

12 Claims, 15 Drawing Sheets

| Command | Input key (access key) |
|---|---|
| OK | O |
| Cancel | C |
| File | F |
| Edit | E |
| View | V |
| Tool | T |
| Help | H |
| ⋮ | ⋮ |
| ⋮ | ⋮ |

FIG.4

```
<!DOCTYPE html>
<html>
<body>
............................................................
............................................................
<input accesskey=o type=button value="OK(O)">
<input accesskey=c type=button value="Cancel(C)">
</body>
</html>
```

FIG.5

| Command | Input key (access key) |
|---|---|
| OK | オ (O in Kana) |
| Cancel | キ (Ki in Kana) |
| File | フ (Hu in Kana) |
| Edit | エ (E in Kana) |
| View | ヒ (Hi in Kana) |
| Tool | ツ (Tsu in Kana) |
| Help | ヘ (He in Kana) |
| ⋮ | ⋮ |
| ⋮ | ⋮ |

| Command | Number of executions |
|---|---|
| ⋮ | |
| File | 513 |
| ⋮ | |
| Edit | 500 |
| ⋮ | |
| View | 434 |
| ⋮ | |
| Tool | 411 |
| Help | 408 |
| ⋮ | |
| Paste | 354 |
| ⋮ | |
| Copy | 331 |
| ⋮ | |
| Cut | 217 |
| ⋮ | |
| Save | 204 |
| ⋮ | |
| Print | 133 |
| ⋮ | |
| Close | 118 |
| ⋮ | |
| Open | 72 |
| ⋮ | |

FIG.12

| File | 0 |
|---|---|
| Edit | 1 |
| View | 2 |
| Tool | 3 |
| Help | 4 |
| Paste | 5 |
| Copy | 6 |
| Cut | 7 |
| Save | 8 |
| Print | 9 |

FIG.13

TERMINAL APPARATUS, ELECTRONIC APPARATUS, AND ACCESS KEY ASSIGNMENT METHOD AND PROGRAM

BACKGROUND OF THE INVENTION

1. Field of the Invention

The present invention relates to a technology for assigning access key functions to commands in a web page to be displayed on a screen by a web browser or commands or the like in a window to be displayed by a Graphical User Interface (GUI) application.

2. Description of the Related Art

For example, when commands such as "OK button" and "Cancel button" are displayed in a web page, access key functions may be assigned to the commands such as "OK button" and "Cancel button".

For example, when (O) appears next to characters "OK" of "OK button" displayed in a web page, it indicates that "O" input key on a keyboard is an access key to "OK button". In this case, a user can select "OK button" by simultaneously pressing the "O" input key and other specific input key (e.g., Alt key), for example.

In this way, when the access key function is assigned to the commands such as "OK button", a user can select various commands by operating input keys on the keyboard without using a pointing device such as a mouse.

Now, when an access key function is assigned to a command in a web page, an access key attribute of Hyper Text Markup Language (HTML) is employed. However, in fact, there exist a large number of web pages in which the access key attribute is not utilized. In this case, naturally, a user may not be able to utilize an access key function.

In Japanese Patent Application Laid-open No. 2007-280028 (Paragraphs [0026] to [0033], [0040] to [0050], FIG. 3, FIG. 7; hereinafter, referred to as Patent Document 1), a technology that enables a user to arbitrarily set or change a shortcut key (access key) is provided. In the technology described in Patent Document 1, a user first enters setting/change of a shortcut key on a setting page of the shortcut key (access key) to be displayed on a screen of a client terminal. A web application 102 of an image forming apparatus 100 generates HTML data in which the setting/change of the shortcut key is reflected and provides it to the client terminal.

SUMMARY OF THE INVENTION

With the technology of Patent Document 1, a user can arbitrarily set or change a shortcut key (access key). However, in the technology described in Patent Document 1, it takes time and effort for the user to set/change the shortcut key, which is troublesome to the user.

In light of the circumstances described above, it is desirable to provide a technology of a terminal apparatus or the like capable of automatically assigning access key functions to commands in a web page.

According to an embodiment of the present invention, there is provided a terminal apparatus including a communication unit and a controller.

The communication unit receives information of a web page from a web server.

The controller extracts commands included in the information of the web page by analyzing the received information of the web page, and assigns access key functions to the extracted commands.

According to the embodiment of the present invention, by the controller, commands are automatically extracted from information of a web page, and access key functions are automatically assigned to the extracted commands. This relieves a user of time and effort to set the access key functions.

In the terminal apparatus mentioned above, the controller may judge a type of a key input device, and assign the access key functions to the extracted commands such that input keys which the key input device has function as access keys to the extracted commands.

In the terminal apparatus, a type of a key input device is judged, and an input key which the key input device has functions as the access key of the extracted command. This enables the user to use the access key function irrespective of which type of key input device the key input device is.

In the terminal apparatus, the controller may preferentially assign the access key functions to the commands of high priority of the extracted commands.

For example, when there are not many input keys to be assigned commands, such as when a terminal apparatus is a mobile phone and a key input device is a numeric keypad, there are some cases in which it is difficult to assign access key functions to all of extracted commands. For example, when a key input device is a numeric keypad, and if more than 10 commands are extracted from information of a wage page, it is difficult to assign an access key function to all of the more than 10 commands.

Thus, in the terminal apparatus, an access key function is preferentially assigned to a command of high priority. This enables appropriate assignment of access key functions to commands extracted from a web page.

In the terminal apparatus mentioned above, the controller may preferentially assign the access key functions to the commands whose number of executions is large.

Since a command whose number of executions is large is a command to be often used by a user, in the terminal apparatus, the access key function is preferentially assigned to the command used often. This enables operability of the access key by the user to be improved.

In the terminal apparatus described above, the controller may preferentially assign the access key functions on the basis of a logical structure of a markup document of the web page.

This enables assignment of access key functions in accordance with meaning of a markup document.

In the terminal apparatus mentioned above, the controller may also assign the access key functions to the commands such that input keys by which characters highly relevant to wording of the commands are entered function as access keys of the commands.

This makes it easier to understand correspondence between the commands and the input keys, thus enabling the user to use the access key function without a feeling of strangeness.

In the terminal apparatus mentioned above, the key input device may also be a key input device for which an input method of characters to be entered by the input keys can be changed.

In this case, the controller may also switch correspondence between the commands and the input keys depending on the change in the input method, when the characters to be entered by the input keys are changed due to the change of the input method.

For example, when a key input device is a keyboard, an input method by entering English and an input method by entering Kana (Japanese character) may be changed. In the terminal apparatus, when the character input method is changed, correspondence between the commands and the input keys is changed. With this, even if the input method is changed, an input key which inputs a character highly relevant to wording of a command can function as an access key of the command.

With this, since easiness to understand the correspondence between commands and input keys is maintained even if the input method is changed, a user can use the access key function without a feeling of strangeness.

In the terminal apparatus mentioned above, the controller may judge whether the access key functions have already been assigned to the commands, by analyzing the information of the web page, newly assign the access key functions, separately from the access key functions which have already been assigned, to the commands in a case where the access key functions have already been assigned, and switches between a first mode which enables the access key functions which have already been assigned to the commands and a second mode which enables the access key functions which have been newly assigned to the commands, depending on an instruction from a user.

This enables the user to arbitrarily switch between the first mode which enables the already assigned access key functions and the second mode which enables the newly assigned access key functions.

In the terminal apparatus mentioned above, the controller may also assign the access key functions to the extracted commands such that the access key functions do not overlap browser access key functions which are assigned to commands of a browser for displaying the web page.

This can prevent overlapping of the browser access key functions assigned to the commands of the browser and the access key functions assigned to the commands of the web page. This can prevent at least one of the browser access key functions and the access key functions from being disabled.

In the terminal apparatus mentioned above, the controller may control display on a screen such that a table showing correspondence between the commands to which the access key functions have been assigned and the input keys is displayed on the screen.

The correspondence between the commands and the input keys may vary when assignment of an access key function to the command is performed (for example, when the access key function is preferentially assigned to the command of high priority). In the terminal apparatus, since a table showing correspondence between the commands and the input keys is displayed on the screen, the user can check the correspondence mentioned above by viewing the table even if the correspondence between the commands and the input keys is changed.

According to an embodiment of the present invention, there is provided an electronic apparatus including a controller.

The controller extracts commands included in a graphical user interface (GUI) application by analyzing a data structure of the GUI application and assigns access key functions to the extracted commands.

In the electronic apparatus according to the embodiment of the present invention, the controller automatically extracts commands from a data structure of the GUI application, and automatically assigns the access key functions to the extracted commands. This relieves the user of time and effort to set an access key function.

According to an embodiment of the present invention, there is provided a method of assigning access key functions, the method including receiving web page information from a web server.

Commands included in the web page information are extracted by analyzing the received web page information.

The access key functions are assigned to the extracted commands.

According to an embodiment of the present invention, there is provided a method of assigning access key functions, the method including extracting commands included in a graphical user interface (GUI) application by analyzing a data structure of the GUI application.

The access key functions are assigned to the extracted command.

As described above, according to the embodiments of the present invention, it is possible to provide a technology of a terminal apparatus or the like which can automatically assign access key functions to commands in a web page.

These and other objects, features and advantages of the present invention will become more apparent in light of the following detailed description of best mode embodiments thereof, as illustrated in the accompanying drawings.

BRIEF DESCRIPTION OF DRAWINGS

FIG. 4 is a diagram showing one example of a table showing correspondence between commands and input keys;

FIG. 5 is a diagram showing one example of HTML data rewritten by an assignment program;

FIG. 12 is a diagram showing one example of a frequency-of-use table;

FIG. 13 is a diagram showing a list of correspondence between commands and input keys to be displayed on a screen;

DESCRIPTION OF PREFERRED EMBODIMENTS

Hereinafter, embodiments of the present invention will be described with reference to the drawings.

First Embodiment

[Overall Configuration and Configuration of Each Part of a Web System]

Figure 1:
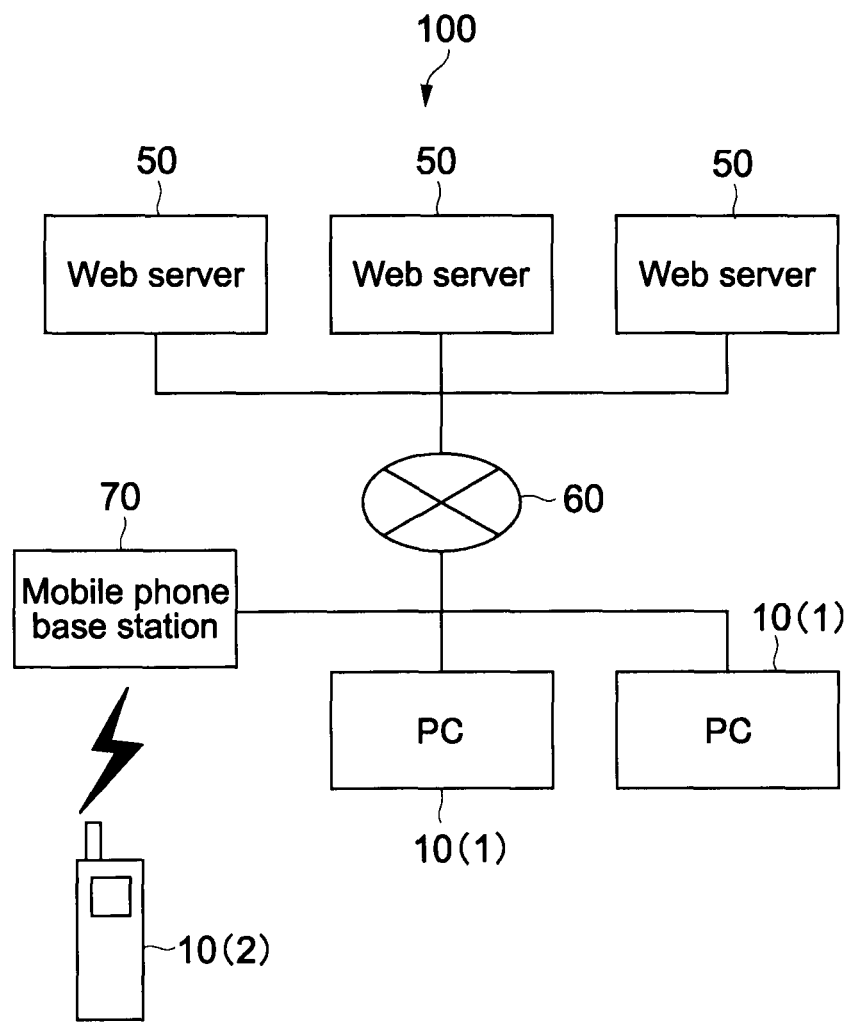
FIG. 1 is a diagram showing a web system including a terminal apparatus according to one embodiment of the present invention.

FIG. 1 is a diagram showing a web system including terminal apparatuses 10 according to a first embodiment of the present invention.

As shown in FIG. 1, a web system 100 includes the terminal apparatuses 10 such as a personal computer (PC) 1 and a mobile phone 2, and web servers 50.

The PCs 1 and the web servers 50 are connected to each other by way of a network 60 such as the Internet. The mobile phone 2 and the web servers 50 are mutually connected by way of a mobile phone base station 70 and the network 60.

Figure 2:
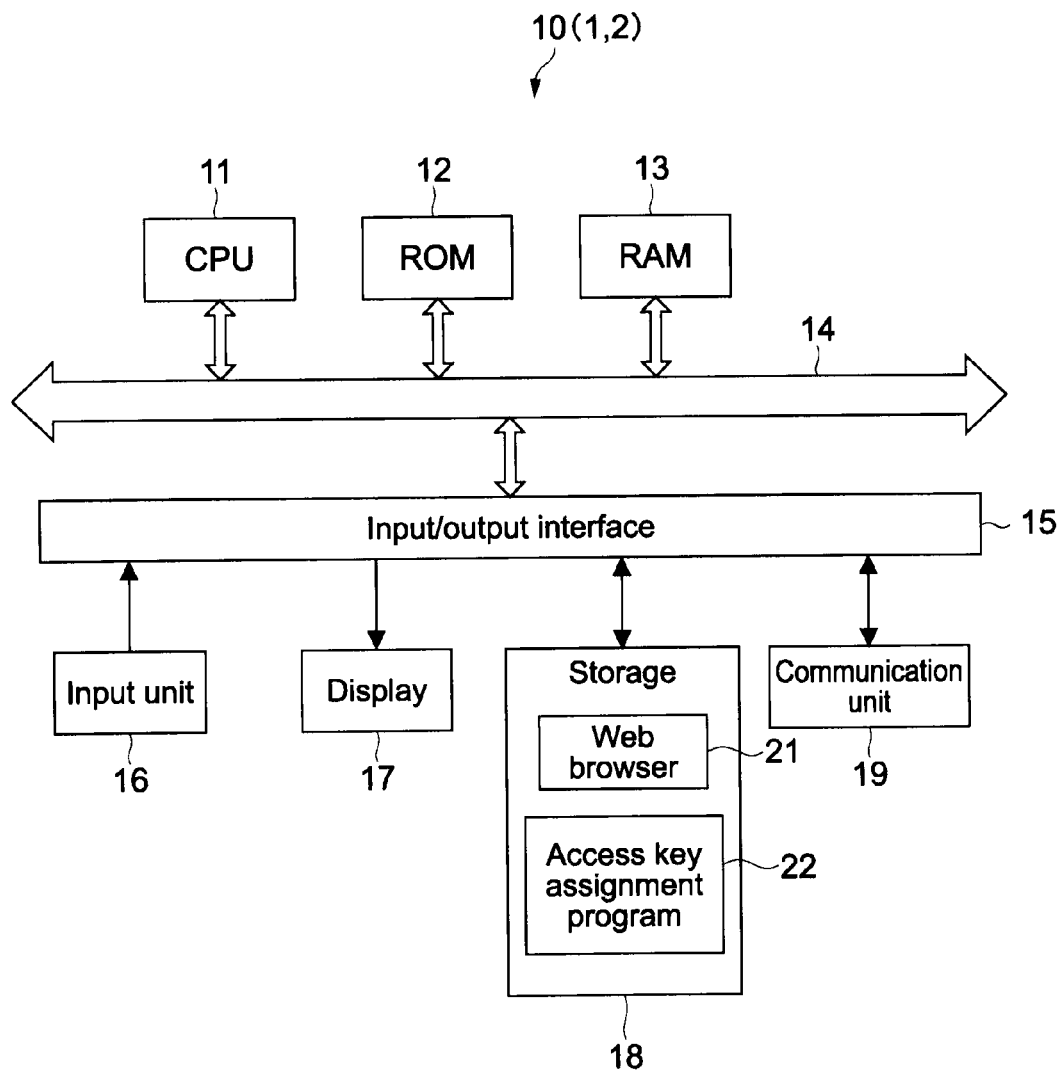
FIG. 2 is a block diagram showing an internal structure of a terminal apparatus (PC or mobile phone)

FIG. 2 is a bock diagram showing an internal structure of the terminal apparatus 10 (PC 1 or mobile phone 2).

As shown in FIG. 2, the terminal apparatus 10 has a central processing unit (CPU) 11 (controller), a read only memory (ROM) 12, and a random access memory (RAM) 13, which are mutually connected by way of a bus 14.

In addition, the terminal apparatus 10 has an input unit 16, a display 17, a storage 18, and a communication unit 19, which are connected by way of an input/output interface 15.

The CPU 11 accesses the RAM 13 as necessary, and controls each part of the terminal apparatus 10 in an integrated manner, while performing various types of arithmetic processing. The RAM 13 is used as a working area of CPU 11 or the like and temporarily stores an operating system (OS), various types of programs being run, various types of data being processed, or drawing data or the like.

The ROM 12 is a nonvolatile memory which stores Basic Input/Output System (BIOS), a boot program, and the like. When power of the terminal apparatus 10 is turned on, the CPU 11 loads the OS stored in the storage 18 to the RAM 13 according to the BIOS and the boot program stored in the ROM 12. With this, the terminal apparatus 10 functions as an information processing apparatus.

The input unit 16 includes a pointing device such as a mouse. The input device 16 includes a key input device such as a keyboard or a numeric keypad.

It should be noted that when the terminal apparatus 10 is a PC 1, the key input device is typically a keyboard. When the terminal apparatus 10 is a mobile phone 2, the key input device is typically a numeric keypad. The input unit 16 receives various types of operation from the user, and outputs the entered operation signal to the CPU 11.

The display 17 includes a thin film transistor (TFT) liquid crystal display or organic electro-luminescence (OEL) display, for example. The display 17 displays images on a screen on the basis of drawing data entered through the input/output interface 15.

The storage 18 includes a nonvolatile memory such as a hard disk drive (HDD) or a solid state drive (SSD), for example. The storage 18 stores an OS and various application programs such as a web browser 21 and an access key assignment program 22, which is a characteristic of the present application.

Although the web browser 21 may include Internet Explorer®, Firefox®, Google Chrome®, Safari®, Opera®, or the like, any of them may be used for the web browser 21.

The access key assignment program 22 is a program which runs, accompanying the web browser 21. Following the access key assignment program 22, the CPU 11 extracts commands from web page information (HTML data), and assigns access key functions to the extracted commands. Details of processing to be performed by CPU 11 on the basis of the access key assignment program 22 will be described later.

The communication unit 19 includes a network interface, a modem, or the like. The communication unit 19 connects to the network 60, and communicates with the web server 50 in accordance with the HTTP protocol. The terminal apparatus 10 transmits a request for web page transmission to the web server 50 by way of the communication unit 19. The terminal apparatus 10 also receives text data such as HTML data or XHTML data of a web page transmitted from the web server 50 through the communication unit 19.

[Description of Operation]

Operation of the terminal apparatus 10 according to this embodiment will be described hereinafter.

It should be noted that in the following description, the operation is based on the web browser 21 or the access key assignment program 22. However, all of operations to be described later will be performed under the control of the CPU 11.

Figure 3:
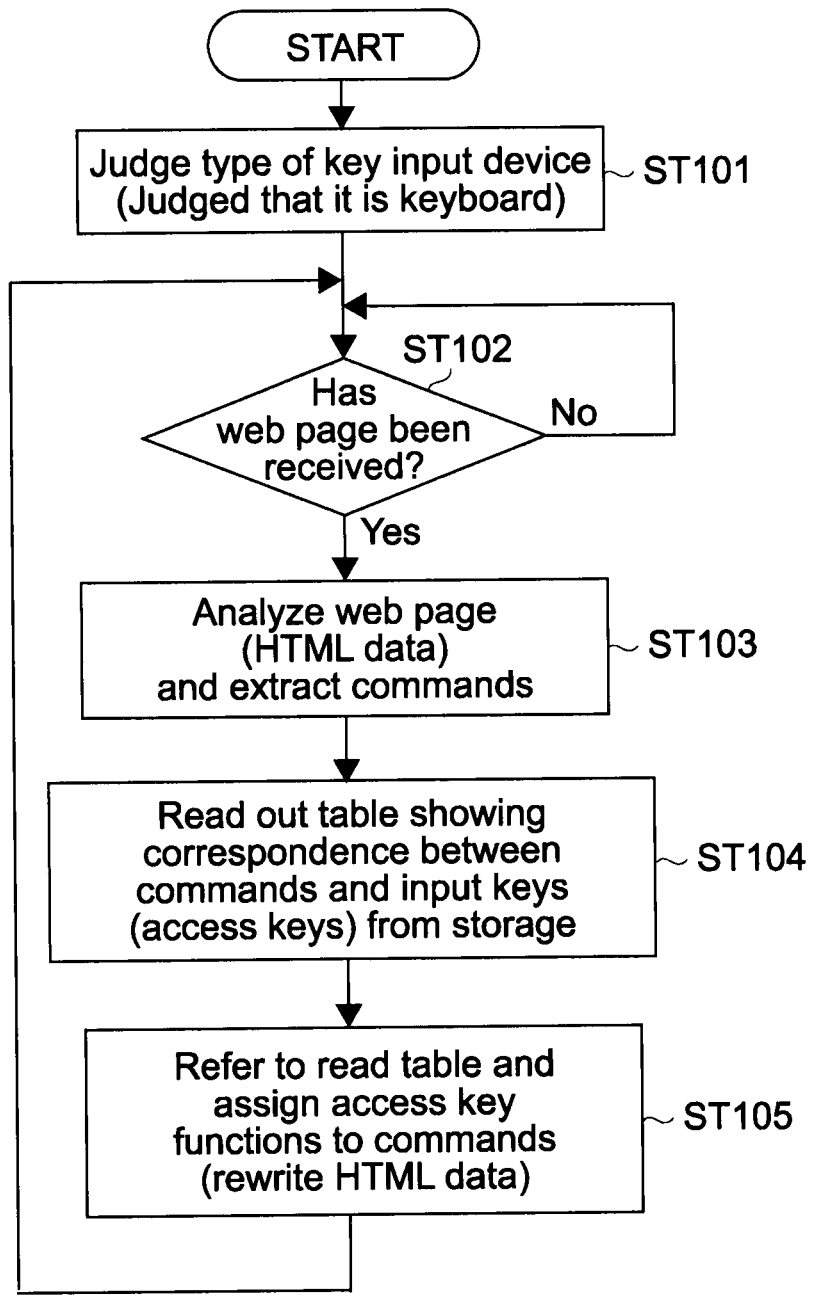
FIG. 3 is a flow chart showing operation of an access key assignment program (terminal apparatus)

FIG. 3 is a flow chart showing the operation of the access key assignment program 22.

It should be noted that in the description of the first embodiment, a case in which the terminal apparatus 10 is a PC 1 and the key input device of the input unit 16 of the terminal apparatus 10 (PC 1) is a keyboard will be described.

First, the access key assignment program 22 (hereinafter referred to as an assignment program 22) judges a type of key input device (step 101). That is to say, in step 101, the assignment program judges whether a type of the key input device of the input unit 16 is a keyboard, a numeric keypad, or any other key input device.

As described above, in the first embodiment, the terminal apparatus 10 is the PC 1 and the key input device of the input unit 16 of the terminal apparatus 10 (PC 1) is a keyboard. Therefore, in step 101, it is judged that the type of key input device is a keyboard.

If it is judged that the type of the key input device is a keyboard, the assignment program 22 then judges whether or not web page information has been received (step 102).

For example, when a window 30 (see FIG. 6) is displayed on the screen of the display 17, a user enters uniform resource locator (URL) in a URL input column 33 (see FIG. 6) in the window 30. In this case, the web browser 21 of the PC 1 accesses the web server 50 through the network 60, following a HyperText Transfer Protocol (HTTP protocol), and requests acquisition of a web page corresponding to the URL. In response to the acquisition request, the web server 50 transmits the web page information in a HyperText Markup Language (HTML) or eXtensible HyperText Markup Language (XHTML) format to the PC 1.

With this, the web page information (HTML data) from the web server 50 is received (YES of step 102).

When the web page information (HTML data) is received, the assignment program 22 analyzes the web page information (HTML data) and extracts a command from the HTML data (step 103).

In step 103, the assignment program 22 judges whether or not the HTML data includes "a element", "button element", "input element" or the like. Then, when the HTML data includes "a element", "button element", "input element" or the like, the assignment program 22 extracts "a element", "button element", "input element", or the like as a command.

In the description on FIG. 3, a case in which "OK button" and "Cancel button" are written in the received HTML data as "input element", and two commands of "OK" and "Cancel" are extracted, for convenience, will be explained.

After extracting a command, the assignment program 22 reads out a lookup table (hereinafter simply referred to as a table) showing correspondence between the commands and input keys, from the storage 18.

FIG. 4 is a diagram showing one example of a table showing correspondence between commands and input keys.

As shown in FIG. 4, "O" input key is associated with "OK", "C" with "Cancel", "F" with "File", "E" with "Edit", "V" with "View", "T" with "Tool", and "H" with "Help".

As is clearly seen from FIG. 4, an input key (access key) which can enter the same character as an initial letter of wording of a command is associated with the command.

In addition to the examples shown in FIG. 4, a large number of commands and input keys are mutually associated and tabulated.

After reading out the table, the assignment program 22 refers to the read table, and assigns access key functions to extracted commands (step 105).

For example, when "OK" and "Cancel" are extracted as a command, the assignment program 22 assigns "O" input key to "OK" and "C" input key to "Cancel", by referring to the table and rewriting the HTML data.

In other words, in step 105, the assignment program 22 assigns the access key functions to the respective commands "OK" and "Cancel" by utilizing an access key attribute and rewriting a part of the HTML data.

FIG. 5 is a diagram showing one example of the HTML data that has been rewritten by the assignment program 22. In FIG. 5, a part surrounded by a broken line represents the part rewritten by the assignment program 22.

When the access key function is assigned to the command, the web browser 21 analyzes the rewritten HTML data, and displays a web page in a main display area 32 in the window 30.

Figure 6:
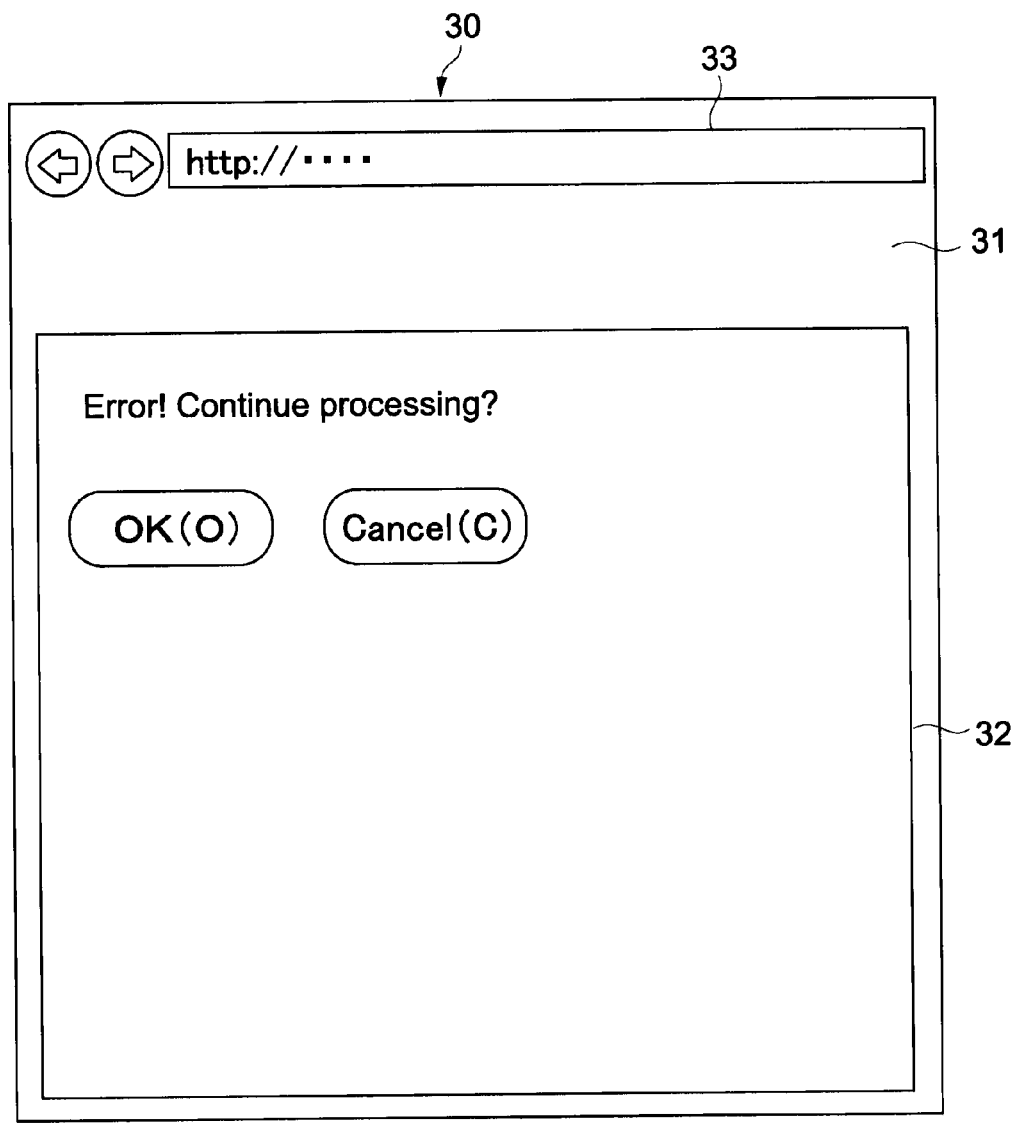
FIG. 6 is a diagram showing how the rewritten HTML data in FIG. 5 is displayed on a screen of a display by a web browser.

FIG. 6 is a diagram showing how the HTML data after having been rewritten shown in FIG. 5 is displayed by the web browser 21 on the screen of the display 17.

In FIG. 6, under characters of "Error! Continue processing?", "OK" button and "Cancel" button are displayed. In this case, (O) appears next to the characters "OK" of "OK button", and (C) appears next to the characters "Cancel" of "Cancel button".

A user can select "OK button" by simultaneously pressing "O" input key and other specific input key (Alt key, for example) on a keyboard. The user can also select "Cancel button" by simultaneously pressing "C" input key and other specific input key (Alt key, for example).

As described above, in the PC 1 according to this embodiment, even if no access key function is assigned to a command in a web page, the assignment program 22 automatically extracts commands and automatically assigns the access key functions to the extracted commands. Thus, in this embodiment, the user no longer has to do any work to set the access key function, which thus relieves the user of time and effort.

In addition, in this embodiment, when commands are "OK" and "Cancel", "O" input key and "C" input key, which can enter initial letters O and C of "OK" and "Cancel", serve as access keys of the "OK" and "Cancel" commands.

That is to say, in this embodiment, the input key which can enter the character highly relevant to wording of the command functions as the access key of the command. Since this makes it easier to understand correspondence between the commands and input keys, the user can utilize access key functions without a feeling of strangeness.

Various Modified Examples of First Embodiment

In the description of the first embodiment, the case in which a table is read out from the storage 18 after commands are extracted from web page information (HTL data) has been described. However, the order of the command extraction and the table read-out may be inverse.

In the description of the first embodiment, the case in which a table is read out from the storage 18 and an access key function is assigned to commands by referring to the table has been described. However, the table mentioned above may not necessarily be needed, and even if the table is not used, it is possible to assign the access key functions to the commands.

In this case, for example, the assignment program 22 may extract an initial letter of a command extracted from web page information (HTML data), and rewrite the HTML data on the basis of the extracted initial letter. This enables assignment of the access key function to the command even without using the table.

(Case in which an Input Method can be Changed)

For example, when the key input device of the terminal apparatus 10 is a keyboard, an input method by entering English and an input method by entering Kana (Japanese character) may be changed.

In a form in which the keyboard input method can be changed, correspondence between commands and input keys which function as access keys of commands may be switched in accordance with change in the input method.

Processing of the assignment program 22 in this case will be described with reference to FIG. 3.

In this case, if it is judged in step 101 that a type of the key input device is a keyboard, the assignment program 22 also judges a keyboard input method.

If it is judged that the keyboard input method is an English input method, the assignment program 22 performs the processing described in the first embodiment mentioned above.

Figures 7, 8:
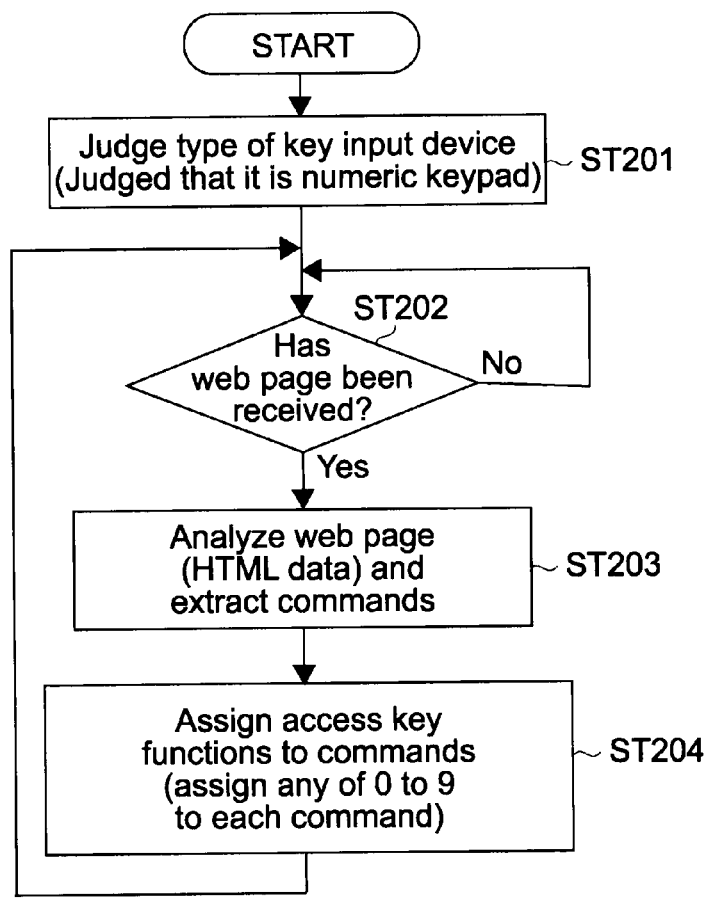
FIG. 7 is a diagram showing one example of a table showing correspondence between commands and input keys.
FIG. 8 is a flow chart showing processing of an assignment program in a terminal apparatus (mobile phone) according to another embodiment of the present invention.

If it is judged that the keyboard input method is a Kana input method, on the other hand, in step 103, the table shown in FIG. 7 is read out. In the example shown in FIG. 7, "O (in Kana)" is associated with "OK", "Ki (in Kana)" with "Cancel", "Hu (in Kana)" with "File", "E (in Kana)" with "Edit", "Hi (in Kana)" with "View", "Tsu (in Kana)" with "Tool", and "He (in Kana)" with "Help".

After reading out the table shown in FIG. 7, the assignment program 22 refers to the table and assigns the access key functions to the commands (step 105). In this case, the assignment program 22 rewrites the HTML data such that the input keys shown in the right column of FIG. 7 function as the access keys of the commands.

With this, for example, "O (in Kana)" input key is assigned to "OK" command as an access key, and "Ki (in Kana)" input key is assigned to "Cancel" command as an access key.

In this case, the user can select "OK button" by simultaneously pressing "O (in Kana)" input key and a specific input key (Alt key, for example). In addition, the user can select "Cancel button" by simultaneously pressing "Ki (in Kana)" input key and a specific input key.

With the processing as described above, even when the keyboard input method is changed, an input key which can input a character highly relevant to wording of a command functions as an access key of the command. With this, since easiness to understand the correspondence between a command and an input key is maintained even if the keyboard input method is changed, a user can use the access key function without a feeling of strangeness.

It should be noted that although the description has been given here such that the keyboard input method is judged in step 101, the keyboard input method may be judged every time web page information is received.

Second Embodiment

A second embodiment of the present invention will be described hereinafter.

In the first embodiment described above, the case in which the terminal apparatus 10 is the PC 1 and the key input device of the input unit 16 is the keyboard has been described. On the other hand, in the second embodiment, a case in which a terminal apparatus 10 is a mobile phone 2 and a key input device of an input unit 16 is a numeric keypad will be described.

FIG. 8 is a flow chart showing processing of an assignment program 22 in the terminal apparatus 10 (mobile phone 2) according to the second embodiment.

First, the assignment program 22 judges a type of a key input device (step 201). Since a type of the key input device of the mobile phone 2 according to this embodiment is a numeric keypad, in step 201, the assignment program 22 judges that the key input device is a numeric keypad.

Then, the assignment program 22 judges whether or not web page information has been received (step 202).

For example, when a user enters URL in a URL input column 33 in a window 30 displayed on a screen of a display 17, a web browser 21 accesses a web server 50 through a mobile phone base station 70 and a network 60, and requests acquisition of the web page. With this, web page information is transmitted from the web server 50 and received by the mobile phone 2 (YES of step 202).

When the web page information (HTML data) has been received, the assignment program 22 analyzes the web page information (HTML data), and extracts commands (step 203). For example, the assignment program 22 extracts "a element", "button element", "input element" or the like as commands in the HTML data.

In the description of FIG. 8, a case in which "OK button" and "Cancel button" are included as "input elements" in the HTML data and "OK" and "Cancel" are extracted as a command, for convenience, will be described.

After extracting the commands, the assignment program 22 rewrites the HTML data such that access key functions are assigned to the extracted commands, "OK", and "Cancel" (step 204). In this case, any one of input keys of 0 to 9 is assigned to each of "OK" and "Cancel" commands. For example, "1" input key is assigned to "OK" command, and "2" input key is assigned to "Cancel" command.

When the access key functions are assigned to "OK" and "Cancel" commands (when the HTML data is rewritten), the web browser 21 analyzes the rewritten HTML data, and displays it on a screen of the display 17 of the mobile phone 2.

Figure 9:
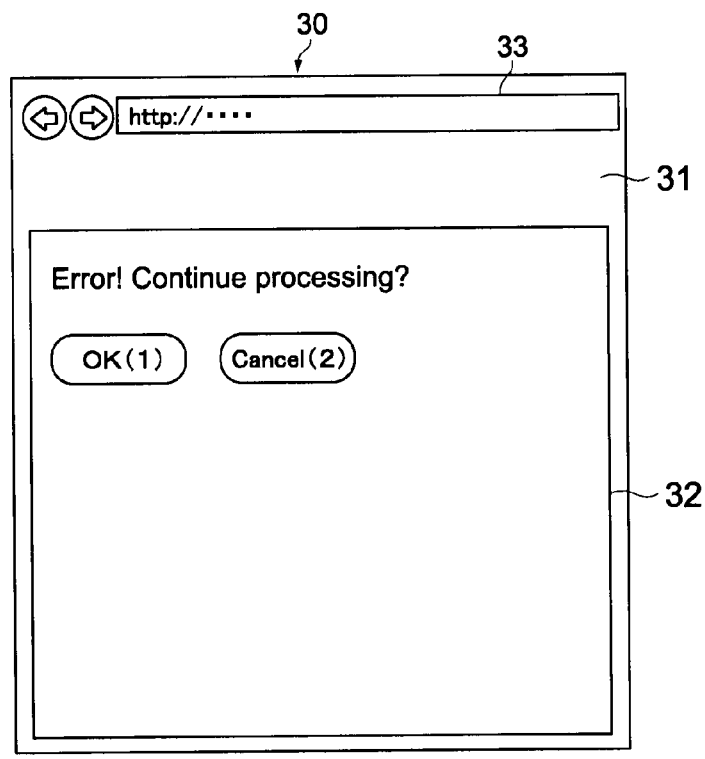
FIG. 9 is a diagram showing one example of a window to be displayed on a screen of a display by the web browser.

FIG. 9 is a diagram showing one example of a window 30 to be displayed on the screen of the display 17 by the web browser 21.

In FIG. 9, (1) appears next to the characters "OK" of "OK button" and (2) appears next to the characters "Cancel" of "Cancel button".

In this case, a user can select "OK button" by pressing "1" input key of numeric keypad of the mobile phone 2. The user can also select "Cancel button" by pressing "2" input key of the numeric keypad.

As described above, in the mobile phone 2 according to the second embodiment of the present invention, similar effects to the first embodiment are achieved. That is to say, even if access key functions are not assigned to commands in a web page, the assignment program 22 automatically extracts commands and automatically assigns access key functions to the extracted commands. Therefore, a user no longer has to do any work to set an access key, which thus relieves the user of time and effort.

In addition, in the second embodiment, a type of a key input device is judged and processing for assigning an access key function corresponding to a type of the key input device is performed. That is to say, processing for assigning access key functions, which can be entered by the numeric keypad, is performed. This also enables utilization of the access key function in the numeric keypad.

Modified Example of Second Embodiment

Incidentally, in some cases of web page information (HTML data) to be transmitted from a web server 50, access key functions have already been assigned by access key attributes to commands. However, even if the access key functions have already been assigned to the commands, it is difficult to use the access key functions in some cases, depending on a type of a key input device.

For example, as in this embodiment, even if "O" input key is assigned as an access key to "OK button" when a key input device is the numeric keypad of the mobile phone 2, there is no input key corresponding to "O" input key on the numeric keypad. In this case, the user may not be able to use the access key functions.

In a case in which the access key function has been assigned to a command of a web page (HTML data) to be transmitted from the web server 50, most of the assigned access key functions can be entered on the keyboard.

Then, for example, if the access key functions that can be entered on the keyboard have already been assigned to commands in a web page, the mobile phone 2 (assignment program 22) may perform assignment processing of access key functions which can be entered on the numeric keypad.

For example, in step 203, an element for which the access key attribute is specified is extracted as a command.

In this case, the assignment program 22 may assign any one of the input keys, among the input keys of 0 to 9, to the extracted command (element for which the access key attribute has been specified) (step 204).

Figure 10:
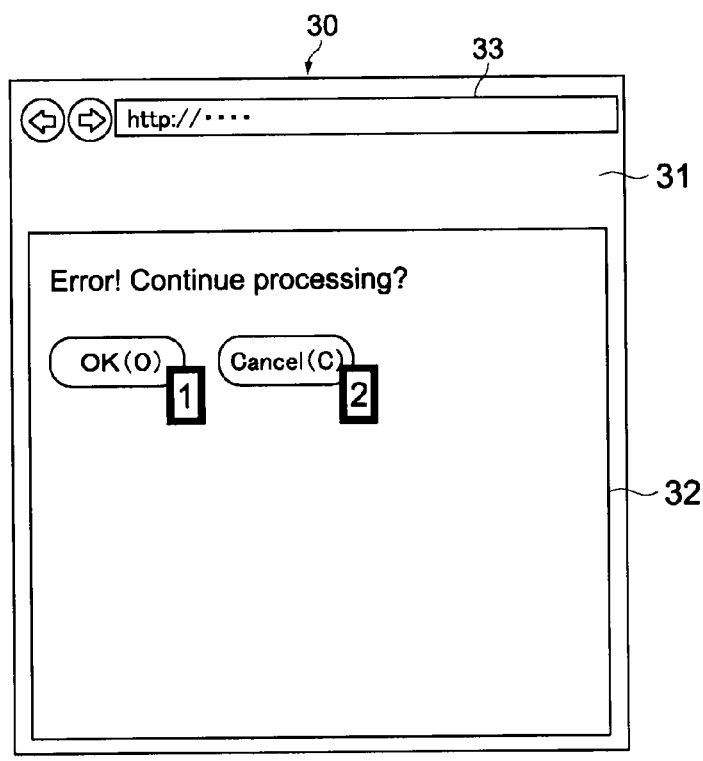
FIG. 10 is a diagram showing one example of a window to be displayed on the screen by the web browser.

FIG. 10 is a diagram showing one example of the window 30 to be displayed on the screen by the web browser 21 when such processing is performed.

FIG. 10 shows one example of a case in which "1" and "2" input keys are further assigned to "OK button" and "Cancel button", respectively, in a case in which the access key functions of "O" and "C" input keys have already been assigned to "OK button" and "Cancel button", respectively.

It should be noted that FIG. 10 shows an example in which "1" enclosed in a thick frame is displayed as overlay of "OK button" and "2" enclosed in a thick frame is displayed as overlay of "Cancel button". In FIG. 10, by the digits of the input keys which function as the access keys being displayed as overlay of each button, the digits of the input keys are displayed in a more visible manner to users.

The user can select "OK button" by pressing "1" input key of the mobile phone 2, and can also select "Cancel button" by pressing "2" input key.

With the processing mentioned above, even when access key functions which can be entered on the keyboard have already been assigned to commands of a web page (HTML data), assignment of the access key functions which can be entered by the numeric keys is implemented.

Third Embodiment

A third embodiment of the present invention will be described hereinafter.

In the third embodiment, a case in which similar to the second embodiment, a terminal apparatus 10 is a mobile phone 2, and a key input device of the terminal apparatus 10 is a numeric keypad will be described.

Now, as with the case in which the terminal apparatus 10 is the mobile phone 2 and the key input device is the numeric keypad, if there are not many input keys to which a command is assigned, access key functions may not be assigned to all of extracted commands.

In the case of the numeric keypad, input keys to which a command is assigned are 10 keys of 0 to 9 input keys. Therefore, if more than 10 commands are extracted from information (HTML data) of a web page, for example, it may be impossible to assign access key functions to all of more than 10 commands.

Hence, in the third embodiment, an access key function is preferentially assigned to a command of high priority.

Figure 11:
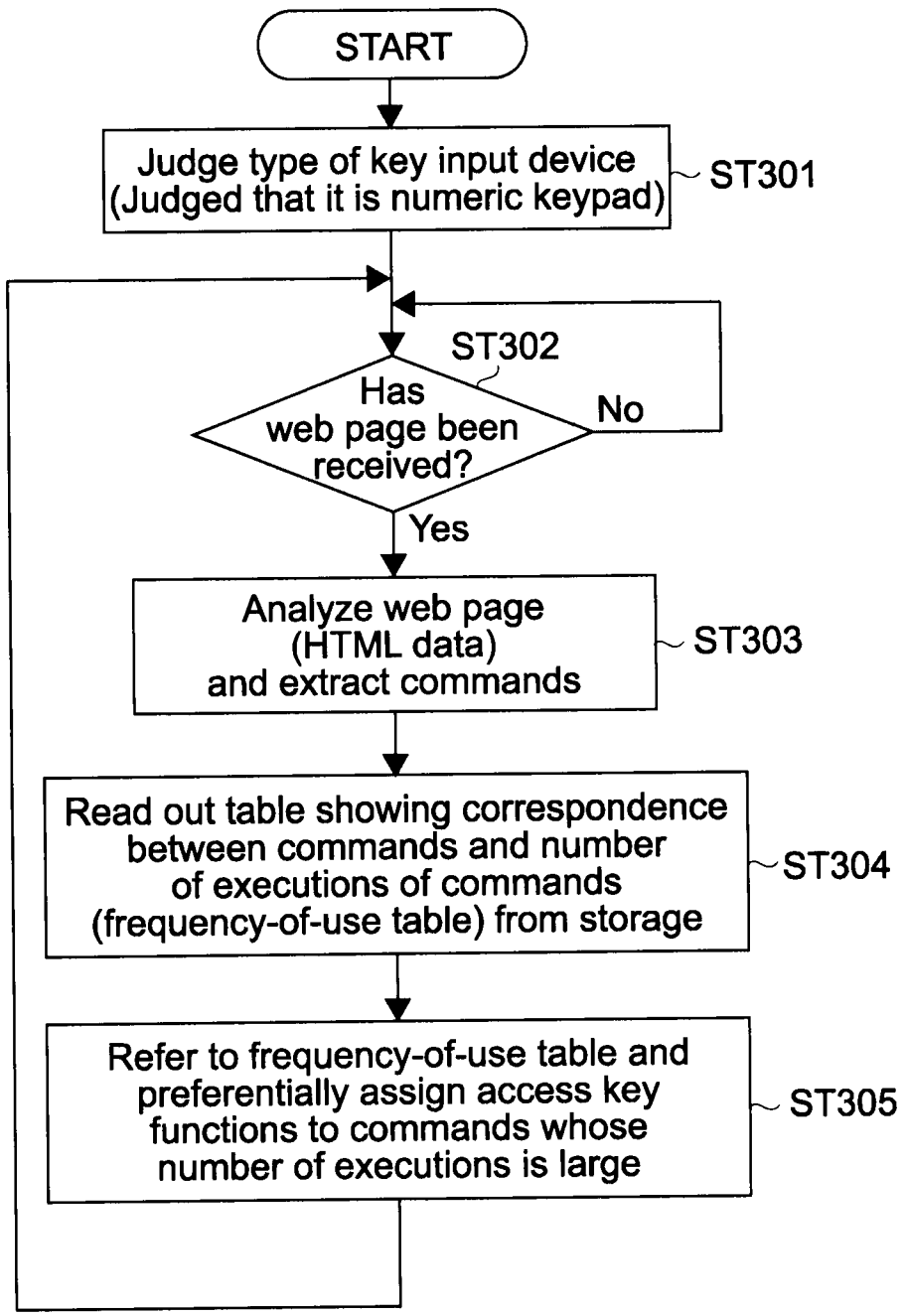
FIG. 11 is a flow chart showing processing of an assignment program in a terminal apparatus (mobile phone) according to still another embodiment of the present invention.

FIG. 11 is a flow chart showing processing of an assignment program 22 in the terminal apparatus 10 (mobile phone 2) according to the third embodiment.

First, the assignment program 22 judges a type of a key input device (step 301). In the third embodiment, since the key input device is a numeric keypad, it is judged that the key input device is a numeric keypad.

Then, the assignment program 22 judges whether or not web page information (HTML data) has been received (step 302). If the web page information has been received (YES of step 302), the process proceeds to next step 303.

In step 303, the assignment program 22 analyzes the received HTML data, and extracts "a element", "button element", "input element" or the like as commands.

Now, a case in which 12 elements of "File", "Edit", "View", "Tool", "Help", "Paste", "Copy", "Cut", "Save", "Print", "Close", and "Open" are extracted as commands, for convenience, in step 303 will be described.

Then, the assignment program 22 reads out a lookup table (hereinafter referred to as frequency-of-use table) showing correspondence between commands and the number of executions of the commands from a storage 18 (step 304).

FIG. 12 is a diagram showing one example of the frequency-of-use table.

For example, as can be seen from FIG. 12, "File" command has been executed 513 times and "Edit" command has been executed 500 times.

The frequency-of-use table shown in FIG. 12 is managed by the assignment program 22. The assignment program 22 updates the frequency-of-use table such that every time the command is executed once, the number of executions of the command increases by 1.

It should be noted that the executions of the command used herein includes both a case in which the command is executed by the access key function and a case in which the command is executed by any other operation (when the command is executed by operation of an arrow key, for example).

That is to say, every time the command is executed once, the assignment program 22 performs processing of increasing the number of executions of the command in the frequency-of-use table by 1, irrespective of whatever operation executes the command.

After reading out the frequency-of-use table from the storage 18, the assignment program 22 refers to the frequency-of-use table, and preferentially assigns the access key function to a command whose number of executions is large, out of the commands extracted from the HTML data (step 305).

For example, when the 12 commands of "File" to "Open" mentioned above are extracted from the HTML data, the assignment program 22 preferentially assigns the access key functions to 10 commands "File" to "Print" whose number of executions is large. In this case, the assignment program 22 assigns the access key functions to the 10 commands of "File" to "Print" by rewriting the HTML data.

Any one input key of 0 to 9 input keys is assigned to each of the 10 commands. In this case, the 0 to 9 input keys may be assigned in the descending order of the number of executions of the commands. Alternatively, the 0 to 9 input keys may be randomly assigned to the commands.

The user can execute the command by pressing any input key of the 0 to 9 input keys.

With the processing shown in FIG. 11, in the third embodiment, the access key functions are preferentially assigned to the commands whose number of executions is large. With this, even in the key input device such as the numeric keypad which does not have many input keys, the access key functions can be appropriately assigned to the commands.

In addition, from the standpoint of users, since the access key functions are preferentially assigned to commands which are used often, this can improve operability of the access key by the user.

Various Modified Examples of Third Embodiment

In the description of the third embodiment, the case in which the access key functions are preferentially assigned to the commands whose number of executions is large has been described. However, assignment of the access key functions is not limited to this, the access keys may be preferentially assigned based on a logical structure of the HTML data (markup document) of a wage page.

For example, a command in a "menu" element in the HTML data is a command which logically represents a menu in the web page. The access key functions may also be preferentially assigned to commands extracted from the "menu" element. For example, when "File", "Edit", "View", "Tool", and "Help" are extracted as commands from the "menu" element, the access key functions may be preferentially assigned to these commands.

Alternatively, when any element for which an access key attribute is specified is extracted as a command, the access key function may be preferentially assigned to the command. That is to say, since the access key attribute is specified to a command to improve convenience by a person who created the HTML data, the access key function may be preferentially assigned to such a command.

In this way, preferential assignment of access key functions on the basis of the logical structure of the HTML data enables assignment of access key functions in accordance with meaning of the HTML data.

Alternatively, the assignment program 22 may perform assignment processing of the access key functions on the basis of both the number of executions and the logical structure.

(Display of List)

Incidentally, in the case of a form in which access key functions are preferentially assigned to commands of high priority, even in the same web page, commands which are to be assigned the access key functions or input keys which function as an access key of a command may differ. This may confuse users.

Hence, for example, the assignment program 22 (or the web browser 21) may perform processing of displaying on a screen a list showing correspondence between a command and an input key when, for example, any specific input key other than the numeric keys is pressed.

FIG. 13 is a diagram showing a list of correspondence between commands and input keys to be displayed on a screen.

The user can check the correspondence between the commands and the input keys by pressing a specific input key and viewing the list shown in FIG. 13. This can prevent users from feeling confused.

Fourth Embodiment

A fourth embodiment of the present invention will be described hereinafter.

It should be noted that in a description of the fourth embodiment, a case in which similar to the first embodiment described above, a terminal apparatus 10 is a PC 1 and a key input device of an input unit 16 of the terminal apparatus 10 (PC 1) is a keyboard will be described.

Now, HTML data of a web page which the terminal apparatus 10 receives is divided into data in which no access key attribute is specified, data in which the access key attribute has already been specified for some commands, and data in which the access key attribute has already been specified for all the commands.

In the fourth embodiment, it is judged which of the HTML data divided into the 3 types mentioned above the received HTML data is, and different processing is performed depending on which of the 3 types of data the received HTML data is.

Figure 14:
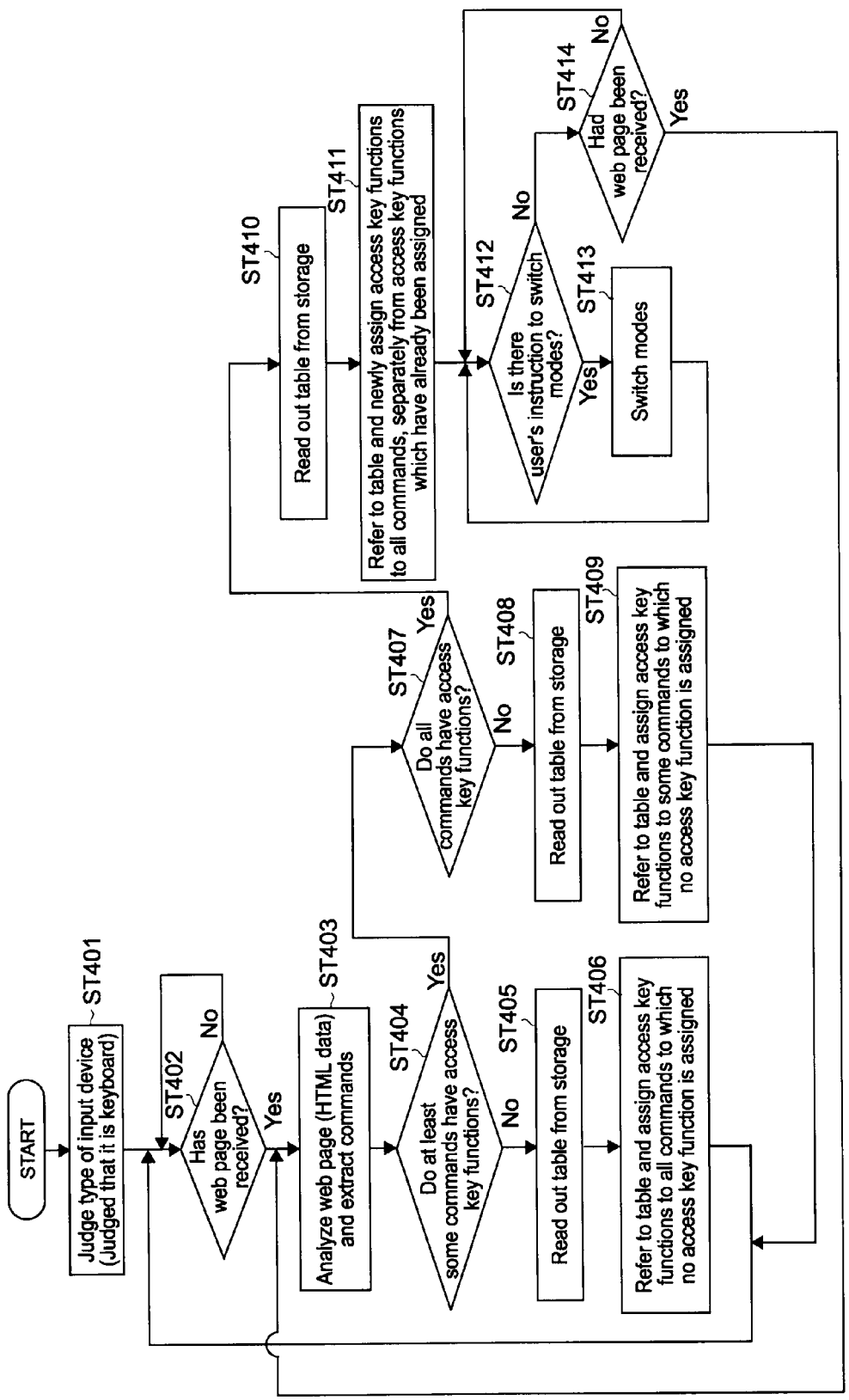
FIG. 14 is a flow chart showing processing of an access key assignment program of a terminal apparatus (PC) according to still another embodiment of the present invention.

FIG. 14 is a flow chart showing processing of an access key assignment program 22 of the terminal apparatus 10 (PC 1) according to the fourth embodiment.

First, the assignment program 22 judges a type of a key input device (step 401). In the fourth embodiment, the terminal apparatus 10 is a PC 1 and the key input device is a keyboard. Thus, in step 401, it is judged that the type of the key input device is a keyboard.

Next, the assignment program 22 judges whether or not web page information (HTML data) has been received (step 402). If HTML data has been received, the assignment program 22 analyzes the HTML data, and extracts commands (step 403). In step 403, the assignment program 22 extracts "a element", "button element", "input element" or the like as commands.

Then, the assignment program 22 judges whether or not the access key functions are assigned to at least some commands of the extracted commands (step 404).

If it is not the case in which the access key functions are assigned to at least some commands of the extracted commands (NO of step 404), the assignment program 22 proceeds to next step 405. That is to say, if the access key functions have not been assigned to any of the extracted commands, the assignment program 22 proceeds to next step 405.

In step 405, the assignment program 22 reads out a table, as shown in FIG. 4 for example, showing correspondence between commands and input keys, from a storage 18. Then, the assignment program 22 refers to the read table, and assigns the access key functions to all commands to which no access key functions has been assigned (step 406). In this case, the assignment program 22 assigns the access key functions to the commands by rewriting the HTML data.

For example, in step 403, two commands "OK" and "Cancel" for which no access key attribute has been specified are extracted from the HTML data. In this case, the assignment program 22 judges that no access key function has been assigned to all the commands (NO of step 404), and assigns "O" and "C" input keys to the "OK" and "Cancel" commands (step 405, 406) (see FIG. 6).

It should be noted that processing of step 402, NO of step 404, and step 406 in the stated order is typically similar to the processing according to the first embodiment mentioned above.

In step 404, in a case in which the access key functions have been assigned to at least some commands (YES of step 404), the assignment program 22 proceeds to step 407.

In step 407, it is judged whether or not the access key functions have been assigned to all commands of the extracted commands.

In a case in which the access key functions have not been assigned to all the commands (NO of step 407) although the access key functions have been assigned to at least some commands (YES of step 404), the assignment program 22 proceeds to step 408.

That is to say, if the access key functions are assigned to some commands of the commands extracted from the HTML data but no access key functions are assigned to some other commands, the assignment program 22 proceeds to step 408.

In step 408, the assignment program 22 reads out the table as shown in FIG. 4, for example, from the storage 18. After reading out the table, the assignment program 22 refers to the table, and assigns the access key functions to some commands to which no access key functions have been assigned.

For example, in step 403, "OK" and "Cancel commands for which no access key attribute has been specified are extracted, and "File", "Edit", "View", "Tool", and "Help" commands for which the access key attribute has already been specified are extracted.

In this case, the assignment program 22 judges that the access key functions have not been assigned to all the commands (NO of step 407) although the access key functions have been assigned to at least some commands (YES of step 404).

Then, the assignment program 22 reads out the table as shown in FIG. 4 from the storage 18 (step 408), and assigns the access key functions to "OK" and "Cancel" commands for which the access key attribute has not been specified (step 409). In this case, "O" input key and "C" input key are assigned to the "OK" command and the "Cancel" command, respectively.

With such processing, the access key functions can be assigned appropriately to the HTML data in which the access key attribute has already been specified for some commands.

In step 407, if it is judged that the access key function has already been assigned to all commands extracted from the HTML data (YES of step 407), the assignment program 22 proceeds to step 410.

In step 410, the assignment program 22 reads out the table, for example, as shown in FIG. 4 from the storage 18.

Then, the assignment program 22 refers to the table, and newly assigns the access key functions to all the commands, separately from the access key functions which have already been assigned (step 411).

Then, the assignment program 22 judges whether or not there has been an instruction for switching modes, from a user (step 412).

It should be noted that the modes refer to a first mode in which any access key functions which have already been assigned to the commands are enabled and a second mode in which the access key functions which have been newly assigned are enabled.

For example, when the user gives an instruction to switch modes through a mouse or keyboard (YES of step 412), the assignment program 22 switches the modes depending on the user's instructions (step 413).

In this case, the assignment program 22 switches the first mode to the second mode if the mode at the time when the user gives an instruction to switch the modes is the first mode. On the other hand, the assignment program 22 switches the second mode to the first mode if the mode at the time when the user gives an instruction to switch the modes is the second mode.

In step 412, if there is no user's instruction to switch modes (NO of step 412), the assignment program 22 judges whether or not the web page information (HTML data) has been received (step 414).

If the web page information has not been received (NO of step 414), the assignment program 22 returns to step 412 and judges whether or not there has been the user's instruction to switch the modes. On the other hand, if the web page information has been received (YES of step 414), the assignment program 22 returns to step 403 and performs processing from step 403.

For example, in step 403, two commands of "OK" and "Cancel" for which an access key attribute has been specified are extracted. In addition, according to the specification of the access key attribute, "Y" input key is assigned to "ON" command and "N" input key is assigned to "Cancel" command as the access keys.

In this case, the assignment program 22 judges that the access key functions are assigned to at least some commands (YES of step 404), and judges that the access key functions are assigned to all the commands (YES of step 407).

Then, the assignment program 22 refers to the table as shown in FIG. 4, and newly assigns "O" and "C" input keys to the "OK" and "Cancel" commands, separately from the access key functions which have already been assigned.

Then, the assignment program 22 switches between the first mode and the second mode depending on a user's instruction to switch the modes (step 412, step 413).

In the first mode, the user can select "OK button" by simultaneously pressing "Y" input key and other specific input key (Alt key, for example). The user can also select "Cancel button" by simultaneously pressing "N" input key and other specific input key.

On the other hand, in the second mode, the user can select "OK button" by simultaneously pressing "O" input key and other specific input key (Alt key, for example). The user can also select "Cancel button" by simultaneously pressing "C" input key and other specific input key.

With the processing mentioned above, since the user can arbitrarily switch between the first mode and the second mode, the user can select a mode he/she likes.

Various Modified Examples

[Overlapping with the Access Key Function of the Browser 21]

Incidentally, there are some cases in which in assignment of access key functions to commands in a web page, overlapping with the access key functions assigned to the web browser 21 (browser access key function) is a problem. In particular, in a case in which a key input device is a keyboard, such a problem occurs.

Figure 15:
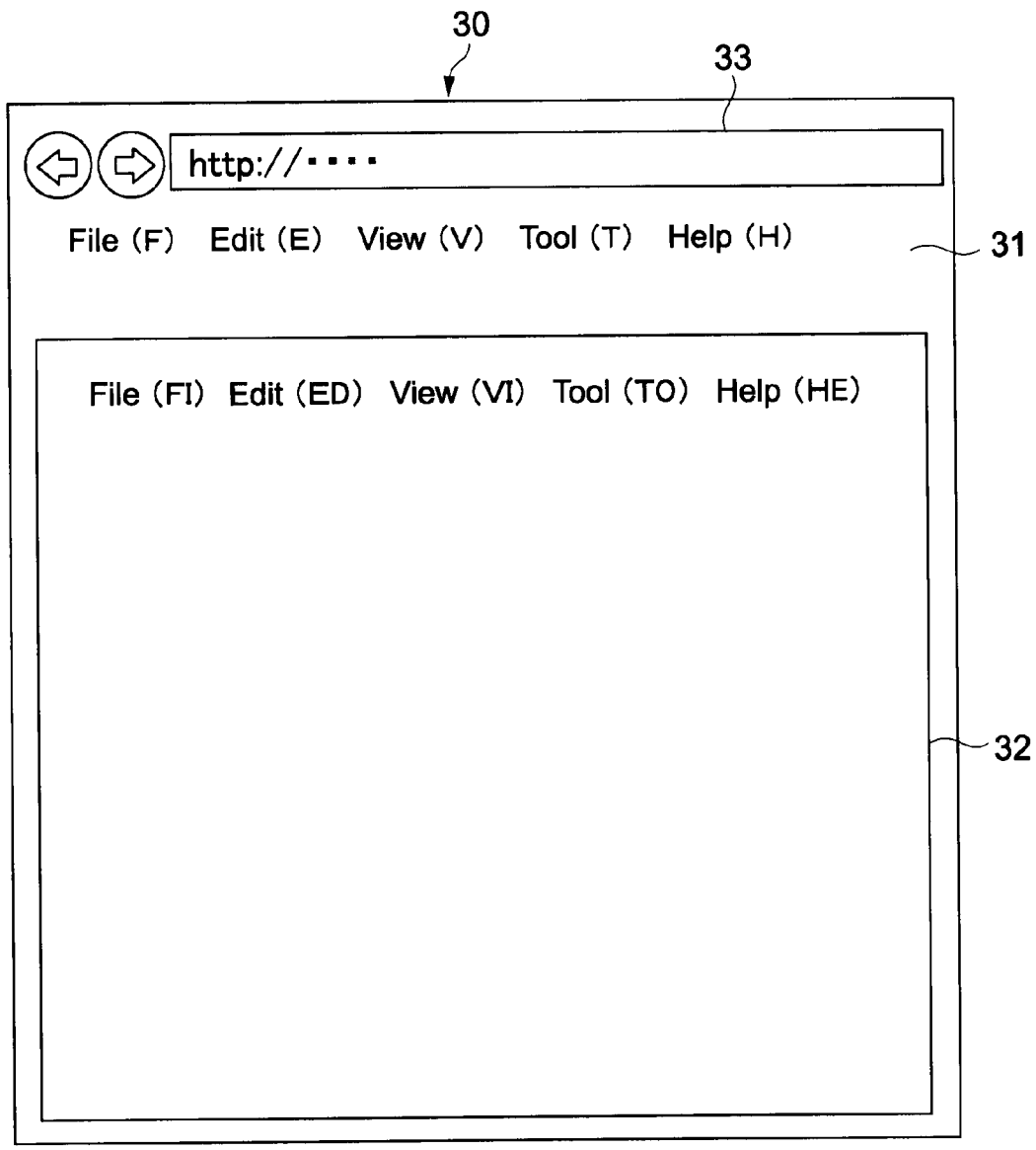
FIG. 15 is a diagram showing one example of a window to be displayed on the screen of the display by a web browser.

For example, as shown in FIG. 15, File (F), Edit (E), View (V), Tool (T), and Help (H) are displayed on an operation panel 31 in the window 30. In this case, it is shown that "F", "E", "V", "T", and "H" input keys function as access keys, respectively for "File", "Edit", "View", "Tool", and "Help" commands.

In such a case, if the "F" to "H" input keys are assigned to "File" to "Help" commands in the web page, at least one of the browser access key function and the access key function will be disabled.

In this regard, the assignment program 22 may assign the access key functions to the commands in the web page so as not to overlap with the browser access key functions of the web browser 21.

For example, as shown in FIG. 15, "FI", "ED", "VI", "TO", and "HE" are assigned to "File", "Edit", "View" "Tool", and "Help" commands in a web page. In this case, for example, the user can execute "File" command by simultaneously pressing "F" input key and "I" input key.

This can prevent functions of at least one of the browser access key functions and the access functions from being disabled.

In the example of FIG. 15, although the case in which two character input keys are used has been described, one character input key which does not overlap with the web browser 21 may also be used.

[Other Examples of Terminal Apparatus]

In each embodiment described above, the description has been given with the PC 1 and the mobile phone 2 as one example of the terminal apparatus 10. However, the terminal apparatus 10 is not limited to the PC 1 or the mobile phone 2. Typically, the terminal apparatus 10 has a communication unit 19, and may be any terminal apparatus 10 as far as it can communicate with a web server 50 by the communication unit 19 by way of a network 60.

Other examples of the terminal apparatus 10 can include a game console, a portable game machine, a television set, or the like. It should be noted that if the terminal apparatus 10 is a game console or a portable game machine, input buttons or the like for game operation are to be assigned access key functions. In addition, if the terminal apparatus 10 is a television set, buttons or the like provided on a remote controller for operating the television set are to be assigned the access key functions.

[GUI Application]

In the examples described above, the terminal apparatus 10 in which the access key functions can be assigned to the commands in the web page has been described. The example described in each embodiment mentioned above, with partial changes, can be applied to an electronic apparatus 80 in which the access key functions can be assigned to commands of a graphical user interface (GUI) application 23.

Figure 16:
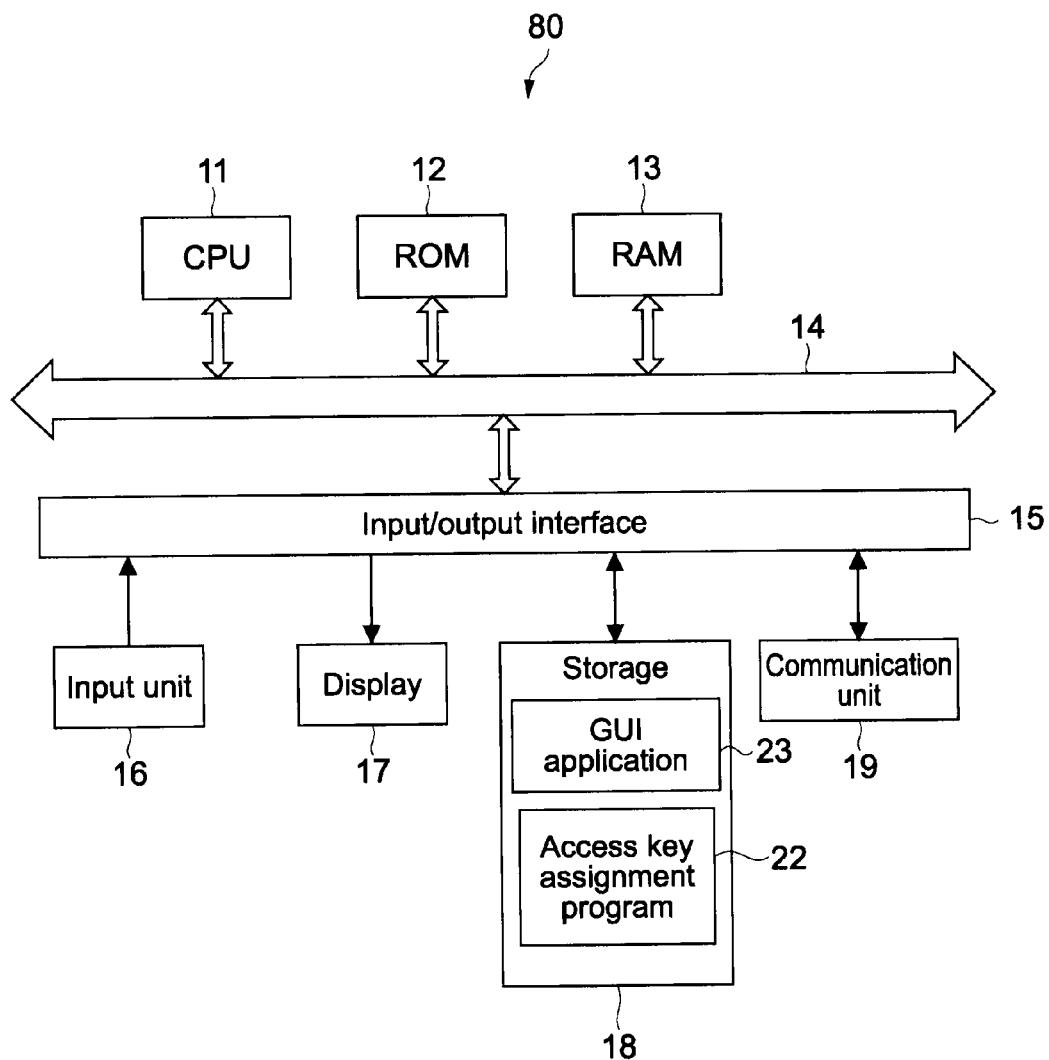
FIG. 16 is a block diagram showing an internal structure of an electronic apparatus.

FIG. 16 is a block diagram showing an internal structure of the electronic apparatus 80.

Although the internal structure of the electronic apparatus 80 is typically similar to that of the terminal apparatus 10 mentioned above, a storage 18 stores the GUI application 23 instead of the web browser 21. It should be noted that the electronic apparatus 80 may not be able to communicate with a web server 50.

Examples of the electronic apparatus 80 include a PC 1, a mobile phone 2, a game console, a portable game machine, and a television set.

Figure 17:
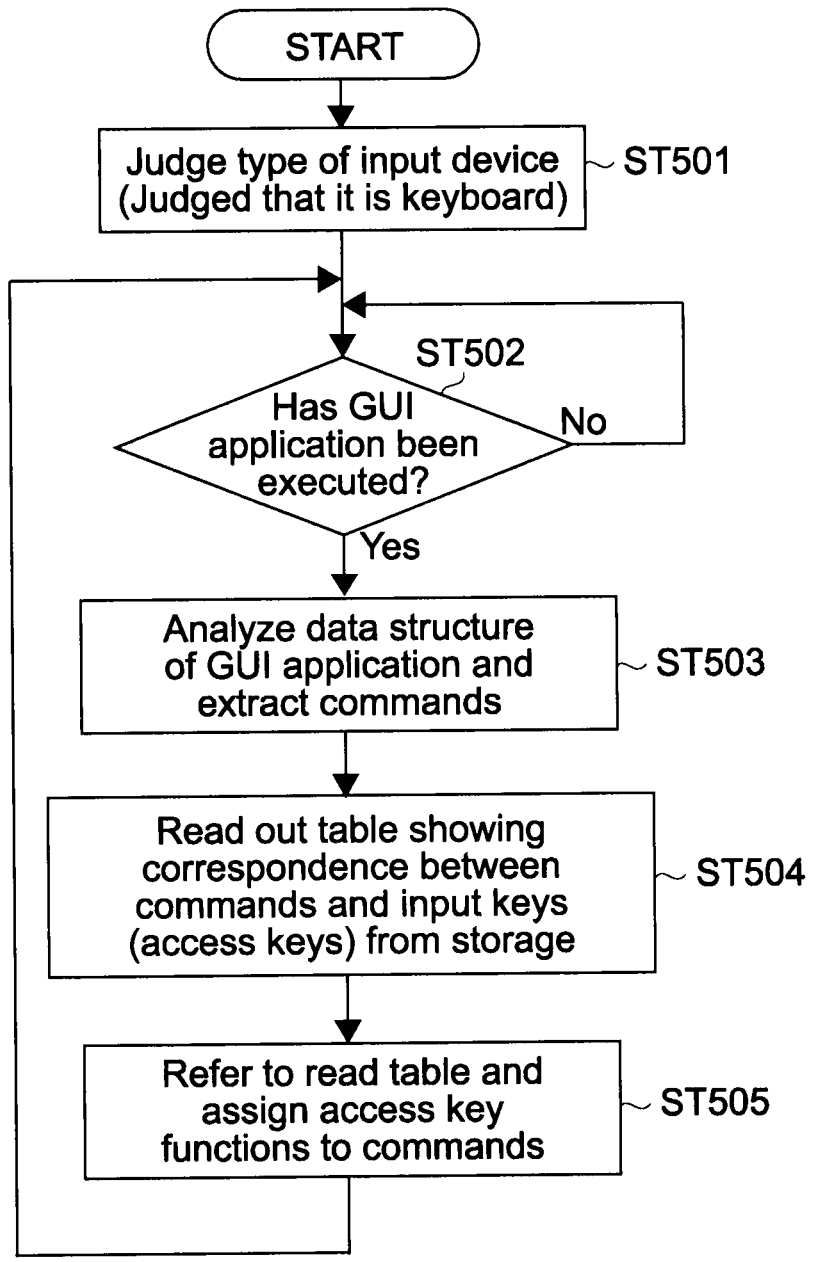
FIG. 17 is a flow chart showing processing of the electronic apparatus (access key assignment program)

FIG. 17 is a flow chart showing processing of the electronic apparatus 80 (access key assignment program 22). In the description of FIG. 17, any point which is different from the first embodiment (FIG. 3) will be mainly described.

It should be noted that a description will be given assuming that the electronic apparatus 80 is a PC 1 and a key input device is a keyboard.

First, the assignment program 22 judges a type of the key input device (step 501) and judges that the key input device is a keyboard.

Then, the assignment program 22 judges whether or not the GUI application 23 has been executed (step 502). If the GUI application 23 has been executed (YES of step 502), the assignment program 22 analyzes a data structure of the GUI application 23, and extracts any command (to which no access key function is assigned) (step 503). In this case, for example, commands in a menu bar 41 in a window 40 (see FIG. 18) or buttons to be displayed in the window 40 are extracted as commands.

It should be noted that a description of FIG. 17 will be given, assuming that "File", "Edit", "View", "Tool", and "Help" are extracted as commands, for convenience.

After extracting commands, the assignment program 22 reads out the table, for example, as shown in FIG. 4 from the storage 18 (step 504). Then, the assignment program 22 refers to the table, and assigns the access key functions to the extracted commands (step 505).

For example, when "File" to "Help" commands are extracted, the assignment program 22 changes a part of the data structure of the GUI application 23 so that "F" to "H" input keys function as access keys for "File" to "Help" commands.

Figure 18:
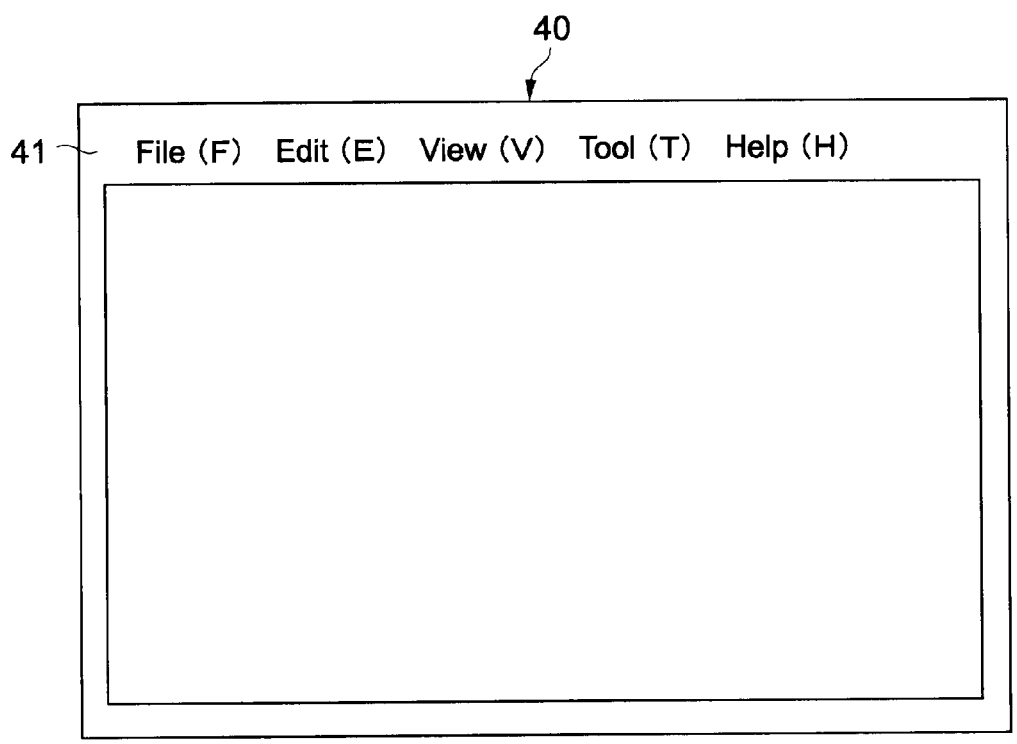
FIG. 18 is a diagram showing one example of a window to be displayed on a screen by a GUI application.

FIG. 18 is a diagram showing one example of the window 40 to be displayed on the screen by the GUI application 23.

As shown in FIG. 18, File (F), Edit (E), View (V), Tool (T), and Help (H) are displayed on the menu bar 41 in the window 40.

The user can execute "File" command by simultaneously pressing, for example, "F" input key and other specific input key (Alt key, for example).

With processing shown in FIG. 17, even if no access key function is assigned to the commands of the GUI application 23, the assignment program 22 automatically extracts the commands and automatically assigns the access key functions to the extracted commands. Therefore, a user no longer has to do any work to set an access key function, which thus relieves the user of time and effort.

In the description of FIG. 17, any point which is different from the first embodiment (FIG. 1) has been mainly described. However, the processing described in each embodiment and each modified example or the like mentioned above can all be applied as assignment processing of the access key functions to the commands of the GUI application 23, by making partial changes.

The present application contains subject matter related to that disclosed in Japanese Priority Patent Application JP 2010-110461 filed in the Japan Patent Office on May 12, 2010, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A terminal apparatus, comprising:
a communication unit configured to receive information of a web page from a web server; and
a controller configured to extract commands included in the information of the web page by analyzing the received information of the web page, and assign access key functions to the extracted commands, wherein
the controller judges a type of a key input device, and assigns the access key functions to the extracted commands such that input keys which the key input device has function as access keys of the extracted commands,
the controller assigns the access key functions to the commands such that input keys by which characters highly relevant to wording of the commands are entered function as access keys of the commands,
the key input device is a key input device for which an input method of characters to be entered by the input keys can be changed, and
the controller switches correspondence between the commands and the input keys depending on the change in the input method, when the characters to be entered by the input keys are changed due to the change of the input method.

2. The terminal apparatus according to claim 1, wherein
the controller preferentially assigns the access key functions to the commands of high priority of the extracted commands.

3. The terminal apparatus according to claim 2, wherein
the controller preferentially assigns the access key functions to the commands whose number of executions is large.

4. The terminal apparatus according to claim 2, wherein
the controller preferentially assigns the access key functions on the basis of a logical structure of a markup document of the web page.

5. The terminal apparatus according to claim 1, wherein
the controller judges whether the access key functions have already been assigned to the commands, by analyzing the information of the web page, newly assigns the access key functions, separately from the access key functions which have already been assigned, to the commands in a case where the access key functions have already been assigned, and switches between a first mode which enables the access key functions which have already been assigned to the commands and a second mode which enables the access key functions which have been newly assigned to the commands, depending on an instruction from a user.

6. The terminal apparatus according to claim 1, wherein
the controller assigns the access key functions to the extracted commands such that the access key functions do not overlap with browser access key functions which are assigned to commands of a browser for displaying the web page.

7. The terminal apparatus according to claim 1, wherein
the controller controls display on a screen such that a table showing correspondence between the commands to which the access key functions have been assigned and the input keys is displayed on the screen.

8. An electronic apparatus, comprising:
a controller configured to extract commands included in a graphical user interface (GUI) application by analyzing a data structure of the GUI application and assigns access key functions to the extracted commands, wherein
the controller judges a type of a key input device, and assigns the access key functions to the extracted commands such that input keys which the key input device has function as access keys of the extracted commands,
the controller assigns the access key functions to the commands such that input keys by which characters highly relevant to wording of the commands are entered function as access keys of the commands, the key input device is a key input device for which an input method of characters to be entered by the input keys can be changed, and the controller switches correspondence between the commands and the input keys depending on the change in the input method, when the characters to be entered by the input keys are changed due to the change of the input method.

9. A method of assigning access key functions, comprising:

receiving web page information from a web server;

extracting commands included in the web page information by analyzing the received web page information;

judging a type of key input device; and assigning the access key functions to the extracted commands such that input keys which the key input device has function as access keys of the extracted commands, wherein the assigning includes assigning the access key functions to the commands such that input keys by which characters highly relevant to wording of the commands are entered function as access keys of the commands, the key input device is a key input device for which an input method of characters to be entered by the input keys can be changed, and the assigning includes switching correspondence between the commands and the input keys depending on the change in the input method when the characters to be entered by the input keys are changed due to the change of the input method.

10. A method of assigning access key functions, comprising:

extracting commands included in a graphical user interface (GUI) application by analyzing a data structure of the GUI application;

judging a type of key input device; and assigning the access key functions to the extracted commands such that input keys which the key input device has function as access keys of the extracted commands, wherein the assigning includes assigning the access key functions to the commands such that input keys by which characters highly relevant to wording of the commands are entered function as access keys of the commands, the key input device is a key input device for which an input method of characters to be entered by the input keys can be changed, and the assigning includes switching correspondence between the commands and the input keys depending on the change in the input method when the characters to be entered by the input keys are changed due to the change of the input method.

11. A non-transitory computer-readable medium including a program causing a terminal apparatus to perform:

receiving web page information from a web server;

extracting commands included in the web page information by analyzing the received web page information;

judging a type of key input device; and assigning access key functions to the extracted commands such that input keys which the key input device has function as access keys of the extracted commands, wherein the assigning includes assigning the access key functions to the commands such that input keys by which characters highly relevant to wording of the commands are entered function as access keys of the commands, the key input device is a key input device for which an input method of characters to be entered by the input keys can be changed, and the assigning includes switching correspondence between the commands and the input keys depending on the change in the input method when the characters to be entered by the input keys are changed due to the change of the input method.

12. A non-transitory computer-readable medium including a program causing an electronic apparatus to perform:

extracting commands included in a graphical user interface (GUI) application by analyzing a data structure of the GUI application;

judging a type of key input device; and assigning access key functions to the extracted commands such that input keys which the key input device has function as access keys of the extracted commands, wherein the assigning includes assigning the access key functions to the commands such that input keys by which characters highly relevant to wording of the commands are entered function as access keys of the commands, the key input device is a key input device for which an input method of characters to be entered by the input keys can be changed, and the assigning includes switching correspondence between the commands and the input keys depending on the change in the input method when the characters to be entered by the input keys are changed due to the change of the input method.

* * * * *